US008348763B2

(12) United States Patent
Moshal et al.

(10) Patent No.: US 8,348,763 B2
(45) Date of Patent: Jan. 8, 2013

(54) METHOD FOR IMPLEMENTING A LIVE DEALER GAME

(75) Inventors: Martin Paul Moshal, Queens Way Quay (GI); Carl Goodwin, Port St. Mary (IM); Grant Smith, Douglas (IM)

(73) Assignee: Cork Group Trading Ltd., Road Town, Tortola (VG)

( * ) Notice: Subject to any disclaimer, the term of this patent is extended or adjusted under 35 U.S.C. 154(b) by 1417 days.

(21) Appl. No.: 11/496,208

(22) Filed: Jul. 31, 2006

(65) Prior Publication Data

US 2008/0026807 A1 Jan. 31, 2008

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................. 463/42; 463/12; 463/13; 463/16

(58) Field of Classification Search .................... 463/13, 463/42, 12, 16

See application file for complete search history.

(56) References Cited

U.S. PATENT DOCUMENTS

| | | | |
|---|---|---|---|
| 3,810,627 A | 5/1974 | Levy | |
| 4,339,798 A | 7/1982 | Hedges et al. | |
| 4,614,342 A | 9/1986 | Takashima | |
| 4,636,951 A | 1/1987 | Harlick | |
| 4,760,527 A | 7/1988 | Sidley | |
| 5,283,734 A | 2/1994 | Von Kohorn | |
| 5,326,104 A | 7/1994 | Pease et al. | |
| 5,382,940 A * | 1/1995 | Takemoto et al. | 340/323 R |
| 5,397,133 A | 3/1995 | Penzias | |
| 5,429,361 A | 7/1995 | Raven et al. | |
| 5,470,079 A | 11/1995 | LeStrange et al. | |
| 5,539,450 A | 7/1996 | Handleman | |
| 5,586,937 A | 12/1996 | Menashe | |
| 5,759,101 A | 6/1998 | Von Kohorn | |
| 5,800,268 A | 9/1998 | Molnick | |
| 6,755,741 B1 | 6/2004 | Rafaeli | |

(Continued)

FOREIGN PATENT DOCUMENTS

DE 4222202 A1 1/1994

(Continued)

OTHER PUBLICATIONS

European Search report from EP07252997 dated Nov. 22, 2007.

*Primary Examiner* — Peter DungBa Vo
*Assistant Examiner* — Wei Li
(74) *Attorney, Agent, or Firm* — McDonnell Boehnen Hulbert & Berghoff LLP

(57) ABSTRACT

A method for implementing a Live Dealer game is disclosed. A live feed of game-play at a gaming table is sent to a remote player. During play, a server receives an indication of a rank and suit of a dealt card. If the card has not yet been revealed at the gaming table, the server will delay transmitting to the remote player data indicating the rank and suit of the dealt card. Upon receipt of a status signal indicating that the card has been revealed at the gaming table, the server will transmit the data indicating the rank and suit of the dealt card to the remote player, thereby substantially synchronizing transmitting the data indicating the rank and suit of the dealt card to the remote player with revealing the card at the gaming table.

15 Claims, 8 Drawing Sheets

U.S. PATENT DOCUMENTS

| | | | | |
|---|---|---|---|---|
| 7,011,309 | B2 | 3/2006 | Soltys et al. | |
| 2002/0094869 | A1 * | 7/2002 | Harkham | 463/42 |
| 2003/0236113 | A1 | 12/2003 | Webb | |
| 2006/0001211 | A1 | 1/2006 | Lewis et al. | |
| 2006/0068917 | A1 | 3/2006 | Snoddy et al. | |
| 2007/0060259 | A1 * | 3/2007 | Pececnik | 463/16 |
| 2007/0178955 | A1 * | 8/2007 | Mills | 463/13 |

FOREIGN PATENT DOCUMENTS

| | | | |
|---|---|---|---|
| EP | 0 478 412 | A1 | 4/1992 |
| FR | 2693120 | | 1/1994 |
| GB | 2389540 | | 12/2003 |
| JP | 01223592 | A | 6/1989 |
| WO | WO9714484 | | 4/1997 |
| WO | WO9814886 | | 4/1998 |

* cited by examiner

800

METHOD FOR IMPLEMENTING A LIVE DEALER GAME

BACKGROUND

In the gaming art, the term "Live Dealer" refers to games in which a player participates in a live game from a location remote from the area of live play, such as a casino. The present disclosure relates to a method of implementing a Live Dealer game, and more particularly, to methods of synchronizing a Live Dealer game between a dealer or local player at a live play area and one or more remotely-participating players.

A Live Dealer game may be available for a variety of live casino games, such as, for example, roulette, baccarat, and blackjack. During a Live Dealer game, a remote player participates in the same game that a local player does. The remote player may receive information from the casino, such as what cards have been dealt by a live dealer or played by a local player, and also transmits information to the casino, such as what wagers have been made or cards played by the remote player. Additionally, the information communicated to the remote player from the casino may include a live video feed of game-play at the gaming table, and also an indication of a rank and suit of each dealt card as the card is scanned or otherwise sensed by a detector, such as a card reader.

However, information sent to the remote player may not always be synchronized with information revealed at the gaming table. For example, the indication of the rank and suit of the dealt card may be sent to the remote player as the card is scanned, but this indication may be sent before the card is actually turned face-up to become visible. In such a scenario, the remote player may receive an indication of the rank and suit of the card before the card is actually revealed to the local player.

A lack of synchronization between the live action and the communication to the remote player may lead to a situation where the participating players perceive that they are at a disadvantage relative to each other. As a consequence, the players may lose confidence in the Live Dealer game, and play less, resulting in less revenue for the game proprietor.

SUMMARY

A method is disclosed for synchronizing a Live Dealer game so that the remote player receives information relating to game-play (e.g., dealt cards and revealed cards) at substantially the same time the information is revealed at the gaming table. In particular, data indicating the rank and suit of a particular dealt card is transmitted to the remote player at substantially the same time that the card is revealed at the actual gaming table.

In one embodiment, a live feed of game-play at the gaming table is sent to the remote player. During play, a server receives an indication of the rank and suit of the particular dealt card. The server delays transmission of data indicating the rank and suit of the particular dealt card to the remote player, however, until it receives a status signal indicating that the particular dealt card has been revealed, or is about to be revealed at the gaming table.

Accordingly, transmission of the data indicating the rank and suit of the particular dealt card to the remote player is substantially synchronized with revealing the card at the gaming table.

The status signal may be sent to the server in a variety of circumstances. In one embodiment, the dealer activates a manual switch, and the status signal is then sent from the switch to the server. In another embodiment, the server receives the status signal when the live feed is processed by a real-time image processor, and when the processor determines that a predetermined portion of the face of the particular dealt card is visible. In yet another embodiment, a Radio Frequency Identification (RFID) tag on the card is read by an RFID reader at approximately the same time the card is revealed, and the RFID reader sends the status signal to the server.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Figure 1:
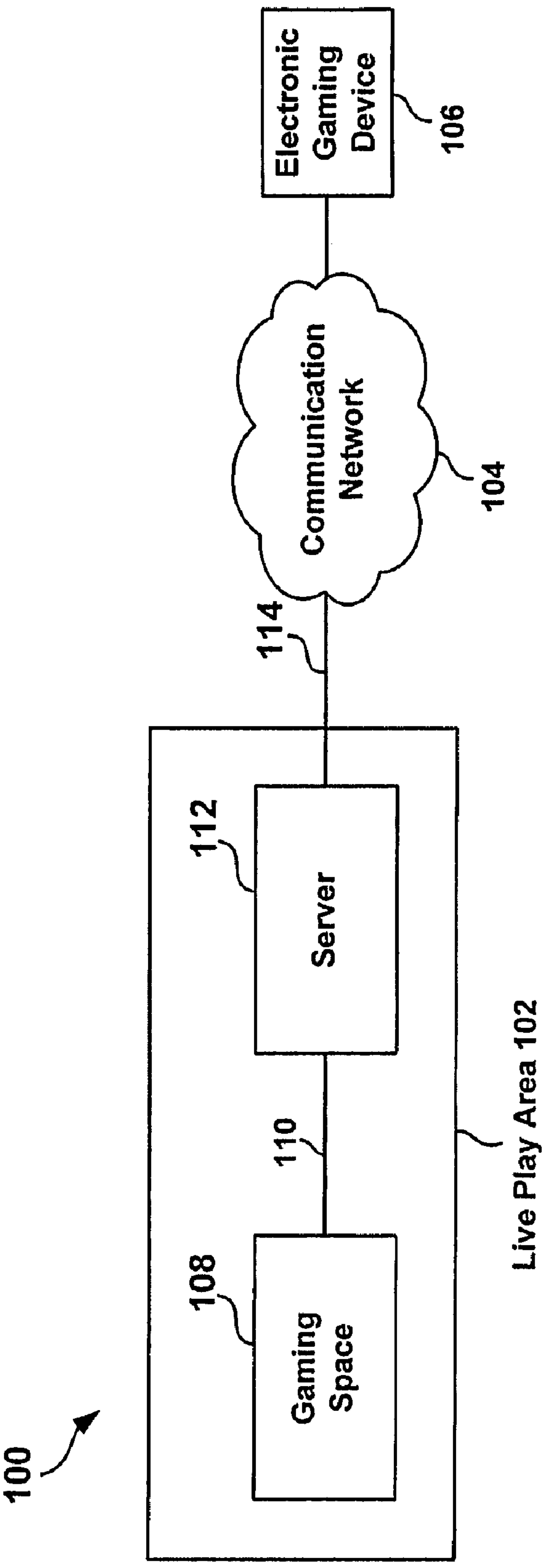
FIG. 1 is an illustration of an example system where a remote player operating through an electronic gaming device may participate in a Live Dealer game via a communication network.
Figure 3:
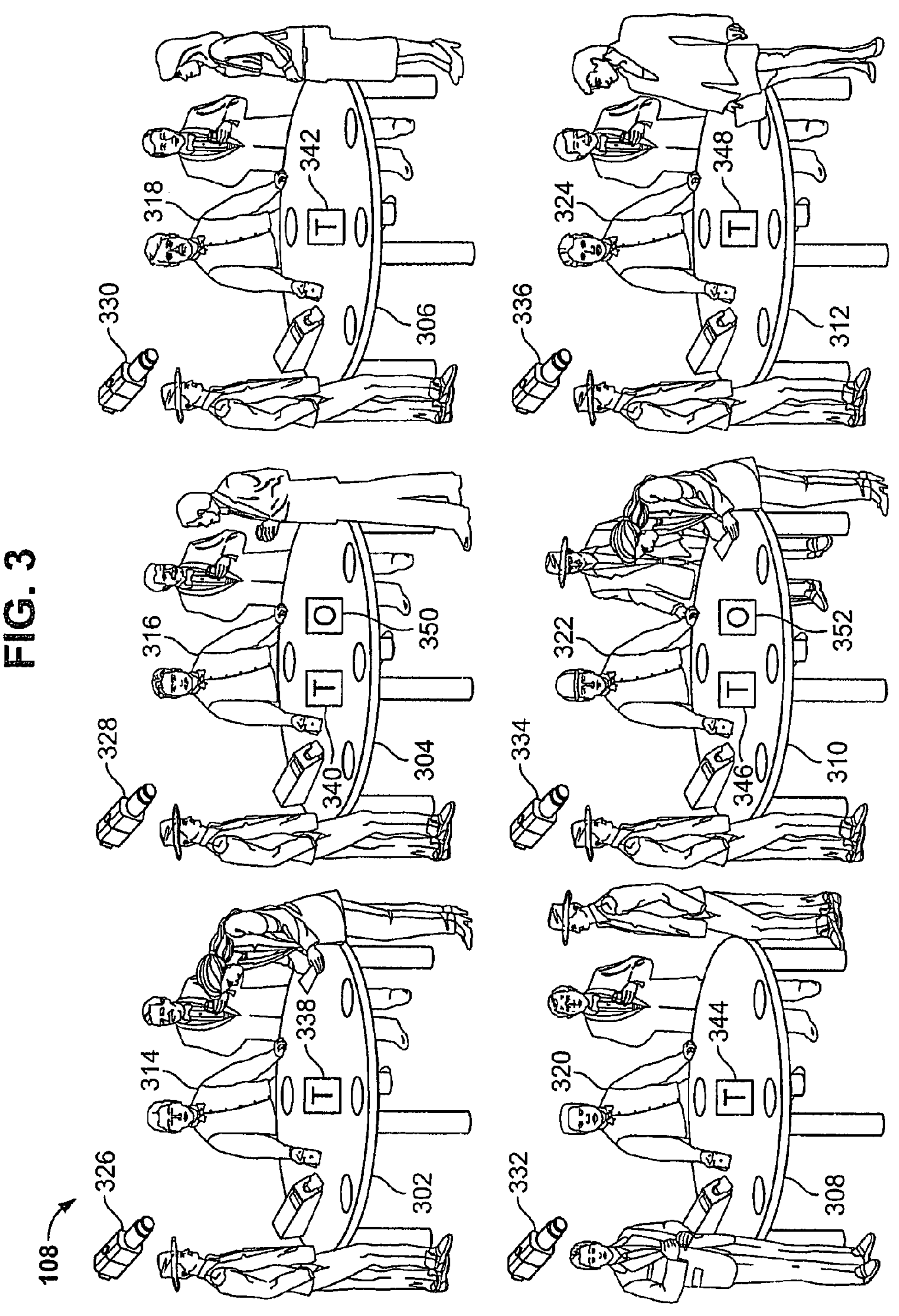
FIG. 3 is an illustration of an example gaming space that includes a multitude of gaming tables, each having its own dealer.

FIG. 1 shows a system 100 that allows a remotely located player to engage in Live Dealer games. As illustrated, the system 100 includes a live play area 102 (for example, a casino), a communication network 104, and an electronic gaming device 106 (e.g., computer, personal digital assistant, cellular telephone, or other kind of electronic device) for use by a remote player. The live play area 102 comprises a gaming space 108, where local players and a dealer are located, a communication link 110, a server 112, and a communication link 114. The gaming space 108 may be, for example, a casino or card room. Further, as depicted in FIG. 3, the gaming space 108 may comprise one or more gaming tables, such as gaming tables 302-312.

The electronic gaming device 106 allows a remote player (or user, more generally) to interact with the live play area 102 by, for example, presenting the remote player with a live feed (either direct feed or animation) of game-play at the live play area 102. In addition, the electronic gaming device 106 may receive user input and transmit the user input to the server 112 via a wireline or wireless interface, for example.

The communication link 110 connects input devices such as a camera or Radio Frequency Identification ("RFID")

reader located at the gaming space 108 with the server 112 to provide a live feed to the electronic gaming device 106. The link 110 may be arranged in a wide variety of configurations. For example, the communication link 110 may be arranged as a plurality of communication links such as a local area network coupled to a wireless network.

The server 112 may be operated by an entity that runs the Live Dealer game or by an entity that is indirectly associated with the Live Dealer game. The server 112 should be understood to include a broad category of electronic communication systems that may communicate with one or more devices in the gaming space 108 and with one or more electronic gaming devices 106 operated by remote players. For example, the server 112 will receive gaming data from the electronic gaming device 106, such as an indication of cards played, bets wagered, etc. Further, the server 112 may be arranged to communicate with entities not depicted in FIG. 1, such as other gaming devices, a web server, or administrative facilities.

The server 112 may be arranged in a variety of configurations and may include a communication interface, a processor, and data storage all linked together via a system bus, for example. As such, the server 112 may perform functions described below by executing computer-readable program instructions stored in data storage to enable a plurality of electronic gaming devices to each play a separate instance of one or more Live Dealer games, to determine the outcome of game-play decisions and game results at a Live Dealer game, to transmit the game results to one or more electronic gaming devices, to operate in conjunction with a larger online gaming system (e.g., a separate gaming server, an online casino website, or a web server), or to manage a remote player's credit account, for example. Within exemplary embodiments, in addition, the server 112 also delays a transmission of data indicating rank and suit of a dealt card at the gaming space 108 to remote players until a status signal indicating the status of the dealt card has been received.

Figure 2:
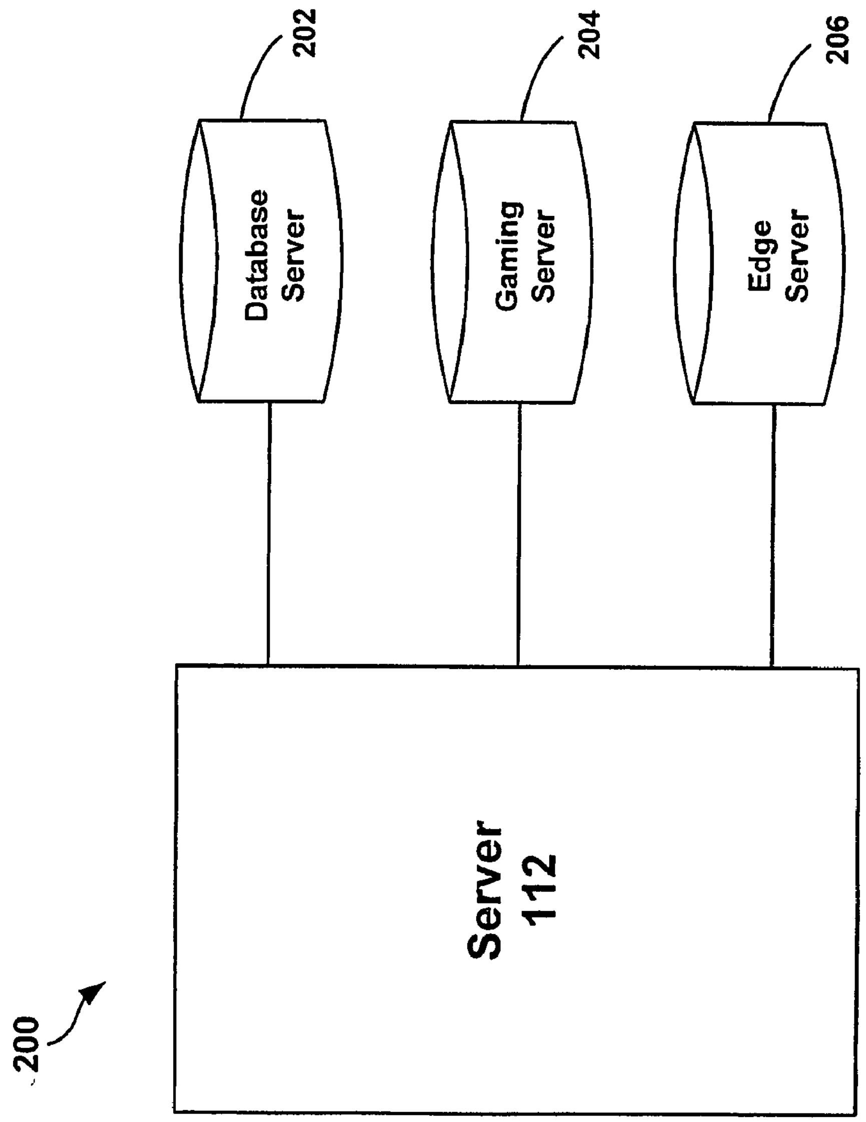
FIG. 2 is a block diagram of an example server and ancillary servers which may be used in carrying out a Live Dealer game in the system FIG. 1.

The server 112 may include discrete servers or may be an integrated server. If distributed among different discrete servers, each server may reside remotely from, or locally in, the live play area 102. For example, FIG. 2 is a block diagram of an example server and ancillary servers that may be used in carrying out a Live Dealer game in the system of FIG. 1. As shown, the server 112 may have access to a database server 202, a gaming server 204, and an edge server 206 (or a dedicated server, more generally). Each server may perform separate functions. For instance, the database server 202 may store game-related information and data, such as, amounts wagered, cards played, etc.

In addition, the gaming server 204 may generate data for transmission to the remotely located players, handle remote player registration, and act as a credit facility. The gaming server 204 may take a variety of configurations, such as a central gaming server, or alternatively, the gaming server may be arranged to avoid use of a centralized server through a peer-to-peer network, a distributed network, or the like. The gaming server 204 may determine the outcome of game-play decisions and game results at the Live Dealer game and transmit the results to a remote player at the electronic gaming device 106 via the communication network 104 and to any other participating remote players at corresponding electronic gaming devices via the communication network 104.

The gaming server 204 may be part of a larger online gaming system. For example, such a gaming system may comprise the gaming server 204 and an online casino website hosted on a casino web server. In one possible arrangement, the online casino website may be accessible by a remote player through the electronic gaming device 106 via the communication network 104. Of course, the online casino website may be connected to a plurality of electronic gaming devices.

The gaming server 204 may also include a corresponding database with a credit account corresponding to each remote player that participates in the Live Dealer game offered by the online casino. Additionally, the online casino website may enable the remote player to place wagers in the Live Dealer game and to be presented with a display of the Live Dealer game.

The illustrative edge server 206 shown in FIG. 2 may transfer data between the gaming space 108 and the communication network 104. For example, the edge server 206 may receive data from the gaming space 108 and transmit corresponding data to a remote player participating through the electronic gaming device 106. Data received and sent by the edge server 206 may take a variety of forms. For example, the data may comprise a live feed of game-play at the gaming table, and the edge server 206 may broadcast the live feed to the electronic gaming device 106.

The communication link 114 couples the server 112 to the communication network 104 and may be arranged in a variety of configurations. The communication link 114 may be arranged as one or more communication links, e.g. as a local area network, each of which may be arranged as a physical or wireless link. Further, each communication link may send specialized data over the link. For example, one link may communicate digital data, while another link may broadcast streaming video, such as a live feed, for example The communication network 104 couples the live play area 102 and the server 112 to the electronic gaming device 106 via the communication link 114. The communication network 104 allows for unidirectional or bidirectional data communication between the server 112 and the electronic gaming device 106. As an example, the communication network 104 may take the form of the Internet or a telephone network.

It should be understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

FIG. 3 is an illustration of an example physical gaming space 108 of the system 100 shown in FIG. 1. In this example, the gaming space 108 includes six tables 302-312, and associated card dealers 314-324, input devices 326-336 (in the form of video cameras), and table-based readers 338-348 (in the form of RFID readers).

A live feed of gaming action occurring at the gaming tables 302-312 is captured by the cameras 326-336 associated with each table, and the live feed is transmitted to electronic devices of remote players that are participating in gaming occurring at the tables. Game play is synchronized for the remote players by timing the delivery of data indicating the rank and suit of cards to the remote players with the revealing of such cards at the gaming table. A gaming table may also include a display device, such as display devices 350 and 352 associated with the gaming tables 304 and 310, respectively, for communicating game play of remote players to a dealer.

Figure 4:
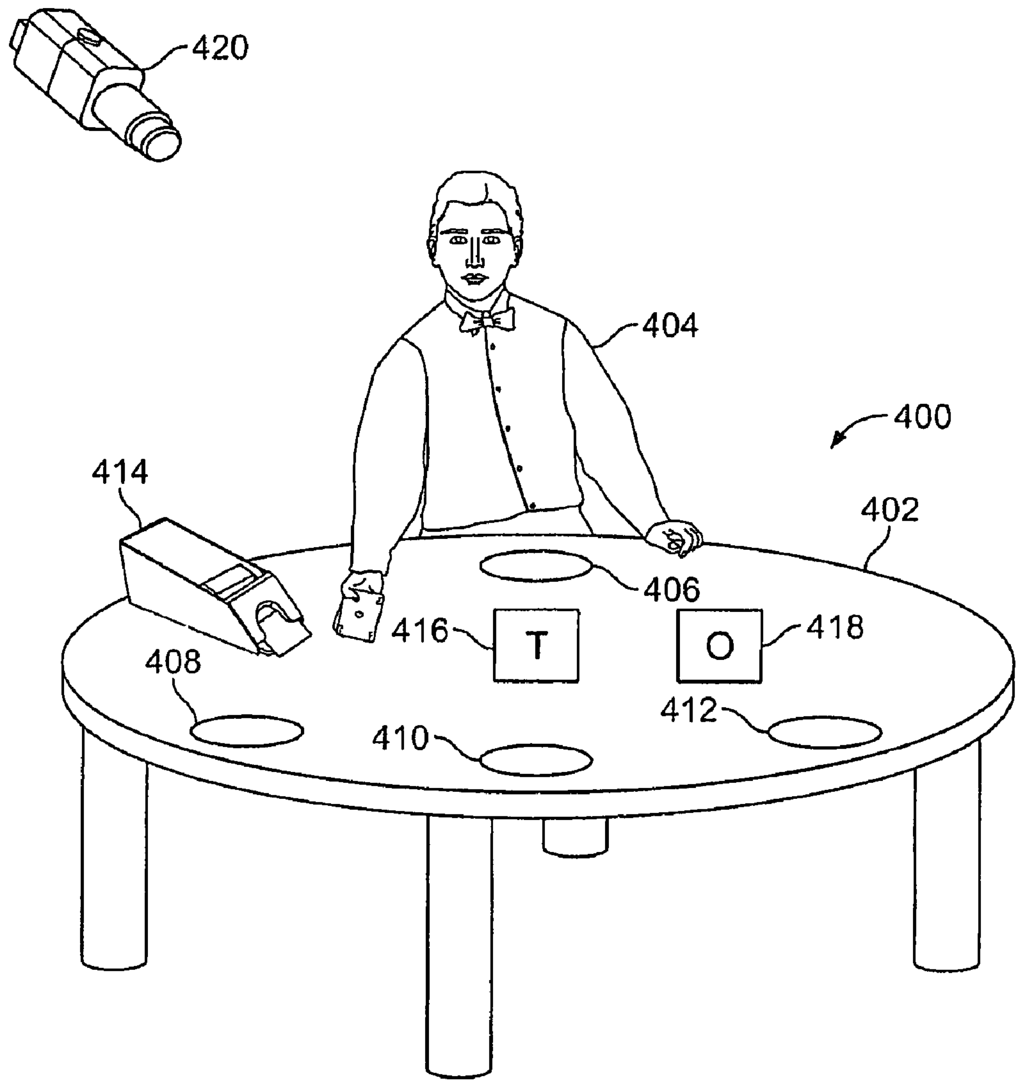
FIG. 4 is an illustration of an example gaming table where a Live Dealer game may occur.

FIG. 4 is an illustration of an example gaming table 400, such as one shown in FIG. 3, where a Live Dealer game may occur. The gaming table 400 includes a table 402, a dealer 404, dealer and player positions 406-412, a card shoe 414 (if a card-based game is played, such as baccarat or blackjack), a table-based reader 416, a display device 418, and a video camera 420.

The table-based reader 416 can identify the rank and suit of a card, for example, and thus may be an optical detector. If a card-based Live Dealer game is played (such as blackjack or baccarat), the optical detector can capture an image of the face of a card. Further, the optical detector may be configured to determine whether a card has been wholly, or partially, revealed at the gaming table 400, i.e., the card is turned face-up. As another example, the table-based reader 416 may be a bar code reader, and in this instance, a face of each card will contain a unique bar code indicating the card's rank and suit (or some kind of unique mark, for example). The bar code reader can then read the bar code on the card as the face of the card is passed over the reader by the dealer 404. As yet another example, the table-based reader 416 may be a manual switch, such as a pushbutton or foot pedal, that can be activated or depressed by the dealer 404 to change the betting status of a game or to communicate to the server 112 that a card has been revealed, i.e., turned face-up.

As one other example, the table-based reader 416 may be an RFID reader, and in this instance, each card may include an RFID tag identifying the rank and suit of the card. The magnitude and orientation of a given card's RFID tag may be configured in such a way as to allow the RFID reader to only read the card's RFID tag when the card is face-up or in the process of being turned face-up by the dealer 404. Hence, the RFID tag on a given card is read by the RFID reader at approximately the same time that the card is turned face-up or revealed.

On the gaming table 402, the display device 418 may include a visual and audio display used to communicate to the dealer the game-play (e.g., hit or stand) and betting decisions made by remote players participating in the Live Dealer game. Such a display may be necessary in games like blackjack, where the outcome of the game is based directly on the game-play decisions made by both local and remote players to the game.

The camera 420 may be positioned in a variety of locations to capture all the gaming activity occurring at the gaming table 400. For example, the camera 420 may be situated above the table 402, pointed toward the dealer 404, placed behind the player positions 408-412, or placed inside or under a rim of the table 402 and directed toward the center of the table 402 (to capture a dealt card that is viewed by the dealer 404 or local player). The camera 420 records a live video feed of game-play at the gaming table 400, which is transmitted over the network 104 shown in FIG. 1 to the remote player's gaming device 106. The live feed may include a digital or analog signal representing gaming action captured by the camera 420.

Figure 5:
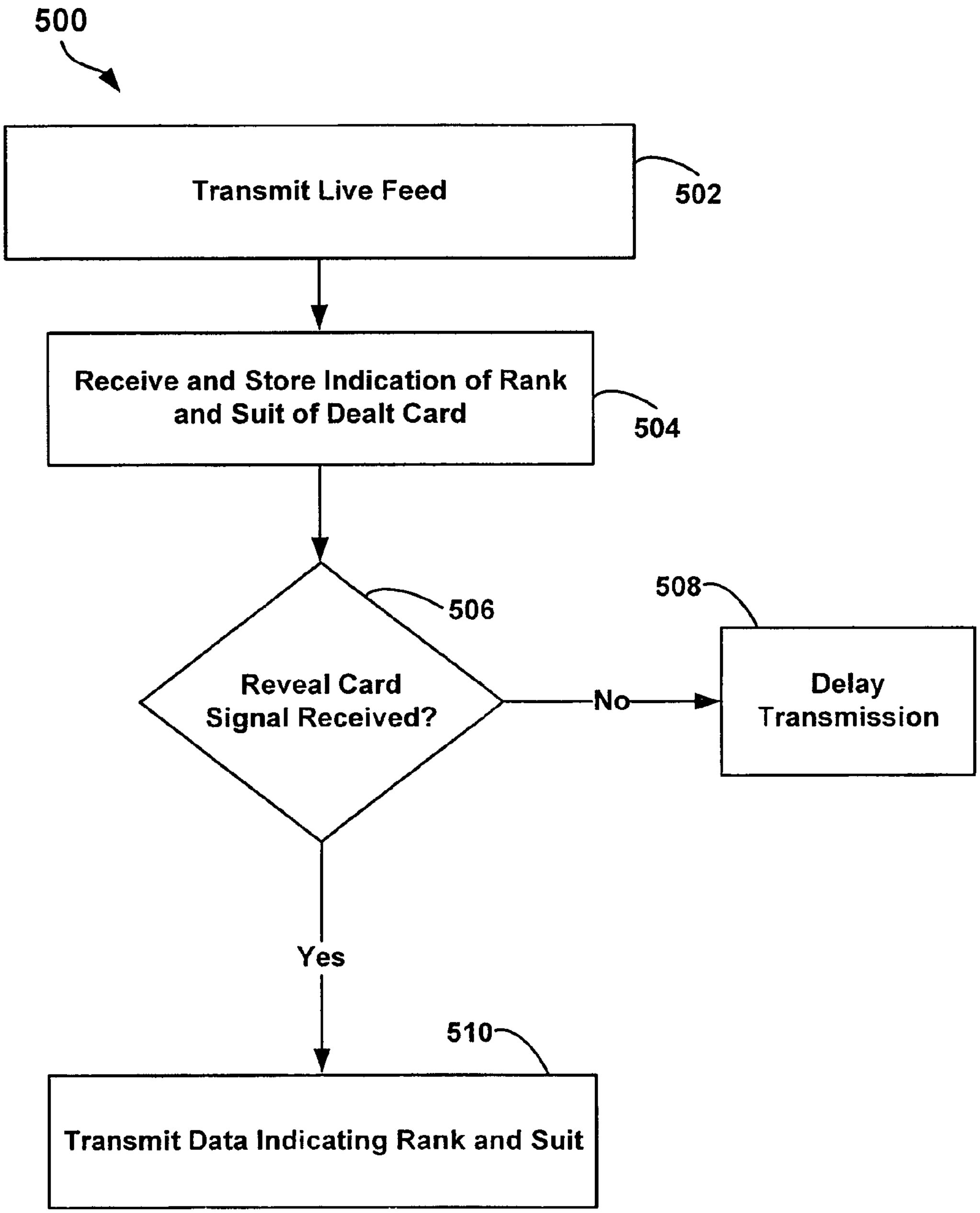
FIG. 5 is a flow chart depicting functional blocks of a method of executing a Live Dealer game in accordance with one embodiment.

FIG. 5 is a flow chart depicting functional blocks of a method of executing a Live Dealer game, such as that at the gaming table 400, for example. Initially, a live feed of game-play at the gaming table 400 is sent to the electronic gaming device 106 and displayed to the remote player, as shown at block 502. To do so, the server 112 will receive the live feed captured by the camera 420, and once the server 112 detects that a remote player operating through the electronic gaming device 106 has joined the Live Dealer game, the server 112 sends the live feed to the remote player.

Next, as shown at block 504, the server 112 will receive and store an indication of a rank and suit of a card dealt by the dealer 404 to one of the players in the Live Dealer game. In one embodiment, a card dealt from the card shoe 414 may be scanned by the dealer 404 through the table-based reader 416 while the card is face-down prior to dealing the card to a player. In another embodiment, the dealer 404 may only scan the card through the table-based reader 416 when that card is to be revealed. In either instance, when the dealt card is scanned through the table-based reader 416, the server 112 receives and stores an indication of the card's rank and suit. At this point, the server 112 has knowledge of the card's rank and suit, however, remote players do not. Of course, if the dealt card is the remote player's card, and the game being played at the table is one in which the remote player can view the card, then, at this point in time, the remote player can have knowledge of the card's suit and rank.

Figure 6A:
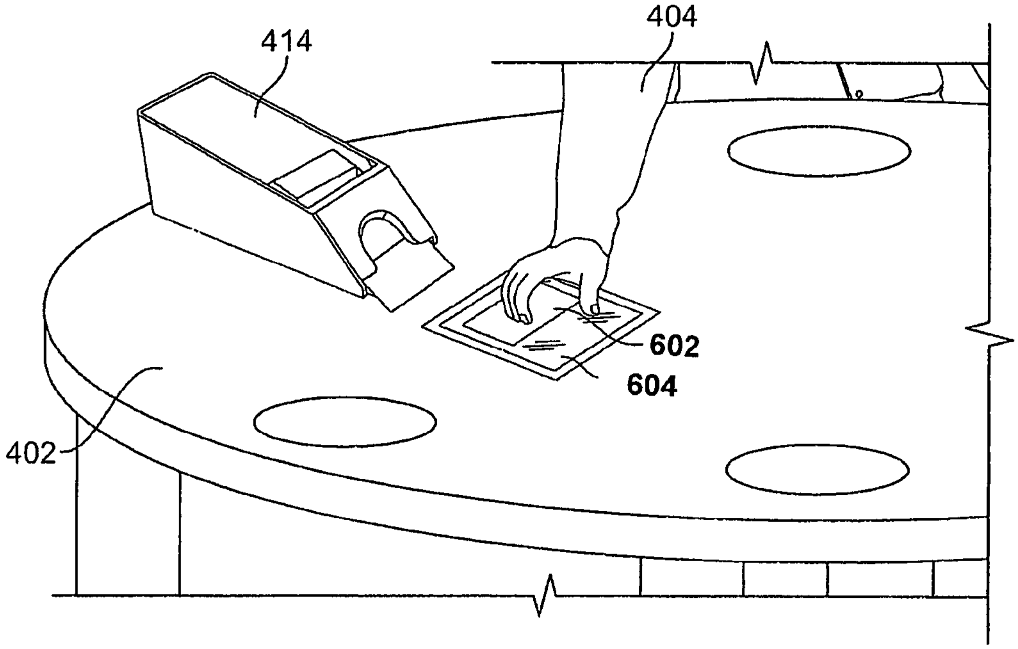
FIGS. 6A and 6B illustrate an example bar code reader on a gaming table, and an example bar code on a card, respectively.
Figure 6B:
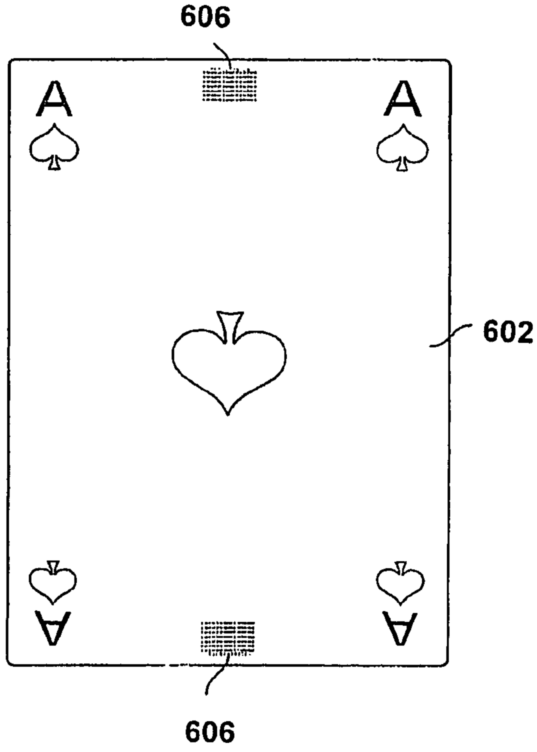

As noted above, to determine the card's rank and suit, the table-based reader 416 may be a bar code reader that reads bar codes as the card is scanned through the reader that are present on the face of the card and indicate the card's rank and suit. FIG. 6A is an illustration of a card 602 being scanned through a bar code reader 604 by the dealer 404. FIG. 6B illustrates an example card including a unique bar code 606 on the face of the card 602.

Figure 7A:
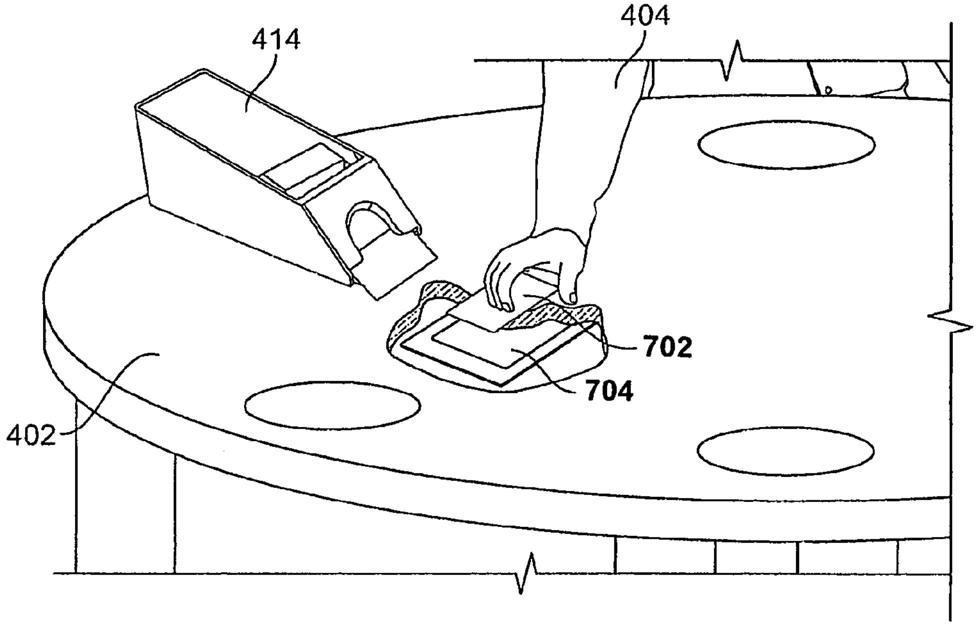
FIGS. 7A and 7B illustrate an example RFID reader placed underneath a gaming table, and an example RFID tag embedded in a card, respectively.
Figure 7B:
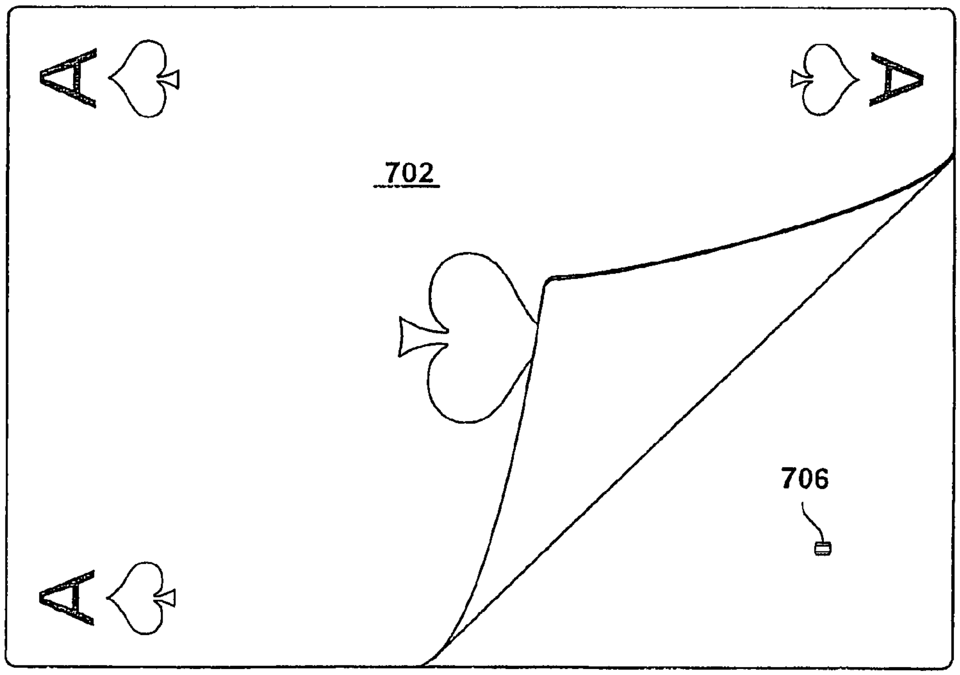

As another example, the table-based reader may be a RFID reader that reads RFID tags embedded within the card as the card is scanned through or over the RFID reader. When the RFID reader reads the RFID tag on a card, the reader sends a signal to the server 112 indicating the tag for the scanned card, thereby providing the server 112 with an indication of the rank and suit of the card. FIG. 7A is an illustration of a card 702 being scanned through or over an RFID reader 704 by the dealer 404. FIG. 7B illustrates an example RFID tag 706 embedded in the card 702.

Alternatively, the table-based reader may be a camera that captures an image of the card, which is sent to the server 112. The server 112 may then analyze the image to determine the identity of the card.

Referring back to FIG. 5, after receiving an indication of the card's rank and suit, a status of the dealt card is determined, as shown at block 506, in order to determine whether to transmit the identity of the card's rank and suit to the remote players. The status of a dealt card may include one of the following: (i) not revealed to all players at the gaming area (e.g., the card is still face-down at the live gaming area on the table 402), (ii) in the process of being revealed (e.g., when the dealer is physically turning the card face-up), or (iii) revealed (e.g., when the card is face-up at the live gaming area and lying flat on the table 402).

If the card's status is "not revealed," then the server 112 will not receive a status signal, or will receive a signal indicating that the card has yet to be revealed at the live gaming area. In this instance, the server 112 delays transmission of data indicating the rank and suit of the dealt card to the remote player until it receives a signal indicating that the card should be revealed, as indicated at block 508. The server 112 may delay transmission of the card's identity by not deriving the rank and suit of the dealt card until the card is to be revealed, for example.

However, if the status of the card is either "in the process of being revealed," or "revealed," then the server 112 will receive a signal indicating that the card should be revealed. Alternatively, the server 112 may receive the reveal card status signal only when the status of the card is "revealed." When the server 112 receives the signal indicating that the card should be revealed then the server 112 transmits data indicating the card's rank and suit to the electronic gaming device 106, as shown at block 510. The transmission indicating the rank and suit of the dealt card may take a variety of configurations. For example, the indication may take the form of a bar code or RFID tag ID corresponding to the card. Software on the device 106 may correlate the code or tag to a particular playing card.

Therefore, because transmission of the card's rank and suit occurs at approximately the same time that the card is revealed at the live gaming table, the live feed showing the card being revealed is substantially synchronized with the electronic gaming device 106 displaying graphic displays of the card's rank and suit. Hence, the remote player is given an indication of the card's rank and suit via a live feed window and graphic displays at substantially the same time.

Figure 8:
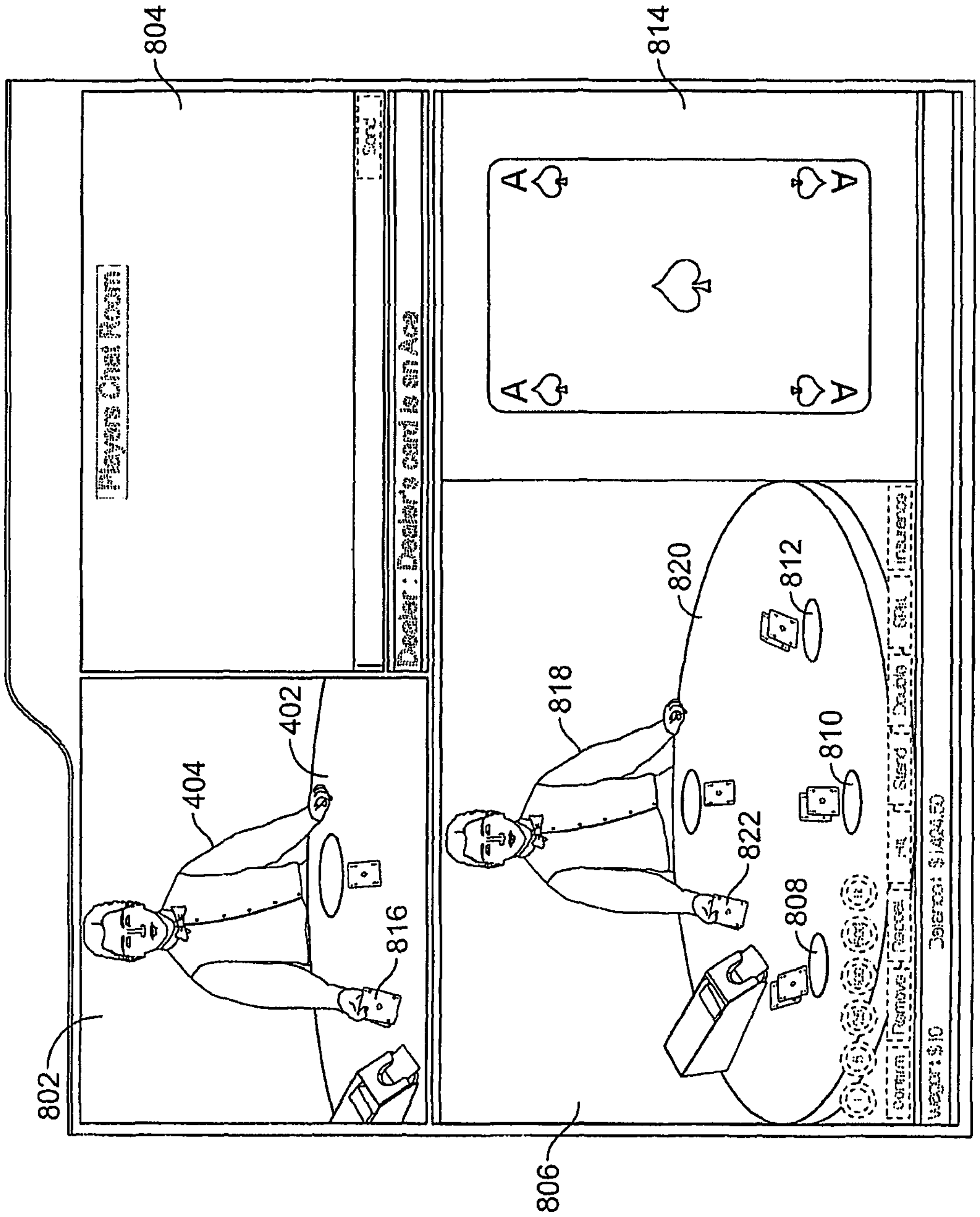
FIG. 8 is an example screen shot of a Live Dealer game display that may be presented to a remote player operating through an electronic gaming device.

FIG. 8 is a screenshot of an example Live Dealer game display 800 that may be presented to a remote player through the electronic gaming device 106. The remote player may download appropriate gaming software from the server 112 to log on and register with the server 112 to play in the Live Dealer game. In this example, the server 112 registers the user as a remote player to the gaming table 400 in the live play area 102. The remote player is then presented with a Live Dealer game display 800. The display 800 includes a live feed window 802, a chat-room box 804, a graphic display 806 of the gaming table, and a graphic display 814 of a rank and suit of a dealt card. The live feed window 802 may show the table 402, the dealer 404, and a card 816 as it is being revealed. The graphic display 806 may include, for example, a graphic display of the dealer 818, the table 820, the rank and suit of the card 822 that is being revealed (which corresponds to the card 816 in the live feed window 802), player positions 808-812, and a simulation of game-play occurring at the gaming table 400 (not depicted). The card 816 is displayed via graphic display 814 when the card is in the process of being revealed.

The server 112 will make a determination as to whether the dealt card is revealed, or whether the card is about to be revealed to the local players (or revealed at the gaming table, more generally). If the card has not been revealed and is not in the process of being revealed, then the live feed window 802 will reflect this fact (i.e., the live feed will show that the card is face-down). At this point, the server 112 delays transmission of data indicating the rank and suit of the dealt card to the remote player. Hence, the remote player will receive no indication of the rank and suit of the card, either through the live feed window 802, the graphic display 806, or through the graphic display 814. Thus, synchronization as to the revealing of a dealt card between the local and remote players exists.

As the card is revealed at the gaming table (or within a short period of time before or after the card is revealed), the server 112 receives a status signal, and responsively transmits data to the remote player indicating the rank and suit of the dealt card. Further, the data may update the graphic displays 806 and 814 with the rank and suit of the dealt card.

Thus, the Live Dealer game is synchronized in such a way that the graphic displays 806 and 814 of the rank and suit of the card will appear to the remote player at approximately the same time the card is revealed at the gaming table, as shown in the live feed window 802. This inspires confidence in the players in the integrity of the Live Dealer game and promotes loyalty to the game proprietor.

The server 112 makes the determination as to whether the dealt card should be revealed through receipt of the status signal. The server 112 may receive the card status signal from a variety of devices and in a variety of ways. In one embodiment, the server 112 receives the status signal from a manual switch. The manual switch may be a pushbutton or a foot pedal, for example. During play, when the dealer 404 has either revealed a card or is in the process of revealing a card, the dealer 404 activates the switch. When the switch is activated, the switch sends a "reveal card" status signal to the server 112. The receipt of the status signal at the server 112 indicates that the card is revealed or is about to be revealed at the gaming table. To maintain synchronization, the server 112 then sends data to the electronic gaming device 106 indicating the rank and suit of the revealed card to the remote player.

The server 112 may also receive the card status signal from the table-based reader 416. For example, if the dealer 404 only passes the card over or through the table-based reader 416 just prior to or upon revealing the card, once the table-based reader reads the card the table-based reader 416 will also send a signal to the signal 112 indicating that the card is being revealed at the gaming table.

As another example, if the table-based reader 416 is an RFID reader, then the RFID reader may read the RFID tag in the card only when the status of the card is "revealed" or "in the process of being revealed," and may not read the RFID tag when the card is "not revealed." This may be accomplished in a variety of ways. For example, the RFID reader may be configured to detect the orientation of the radio signals emitted from the RFID tag. An antenna of the RFID tag may direct the RFID tag's signals downward when the card is face-up and upward when the card is face-down. In this instance, when the RFID reader detects that the tag's signals are upward (i.e., the card is face-down), then the RFID reader will not read the RFID tag. On the other hand, when the RFID reader detects that the tag's signals are downward, or generally downwards (i.e., the card is face-up, or in the process of being turned face-up by the dealer 404), then the RFID reader will read the RFID tag on the card, and then transmit a signal to the server 112 indicating that the card should be revealed to the remote player.

As another example, the RFID reader may be configured to detect the magnitude of the radio signals emitted the RFID tag, and based on the magnitude of the signals from the RFID tag, the RFID reader will read or not read the RFID tag. Magnitudes of the radio signals from the RFID tag may be altered by shielding one side of the RFID tag so as to diminish the magnitude of the radio signals on the shielded side, for example. Upon reading the RFID tag, the RFID reader will then transmit a signal to the server 112 indicating that the card should be revealed to the remote player.

In yet another example, real-time image processing of a card shown in the live feed may trigger the server 112 to reveal the rank and suit of the card to the remote player. The live feed captured by the camera 420 could be processed by a real-time image processor to determine the status of a card shown in the live feed. If, for example, the real-time image processor determines that a predetermined portion of the face of the particular dealt card is visible, the camera 420 may determine that the status of the card is either "revealed" or "in the process of being revealed," and thus transmit the status signal to the server 112. The predetermined portion of the face card that triggers a determination that the card is either "revealed" or "in the process of being revealed" may vary from, for example, 5% of the face card to 100% of the face card. In one embodiment, a dealt card is deemed revealed at the gaming table when 75% of the face of the card is recognized through commercially available image analysis techniques.

In these examples, when the table-based reader 416 signals the server 112 to reveal the card to the remote player, the table-based reader 416 may also include within the signal the identification of the card's rank and suit. Thus, the server 112 may receive an indication of the card's rank and suit at approximately the same time that the server 112 receives a status signal indicating that the card is either revealed or about to be revealed.

Since many modifications, variations, and changes in detail can be made to the described embodiments, it is intended that all matters in the foregoing description and shown in the accompanying drawings be interpreted as illustrative and not in a limiting sense. Further, it is intended to be understood that the following clauses further describe aspects of the present application.

(1) An apparatus for synchronizing a live dealer game, comprising:

a server communicatively coupled to at least one client device through a communication network; a camera to capture a live feed of game-play at a gaming table; a reader to read an indication of a rank and suit of a dealt card at the gaming table; and a processor coupled to the server, camera, and reader, wherein the processor: (i) sends the live feed of game-play to the at least one client device, (ii) receives from the reader the indication of the rank and suit of the dealt card; (iii) delays transmission of data indicating the rank and suit of the dealt card to the at least one client device until the server receives a status signal indicating the status of the dealt card; and (iv) upon receipt of the status signal by the server, transmits the data indicating the rank and suit of the dealt card to the at least one client device so that the transmission is substantially synchronized with an appearance of the dealt card in the live feed of game-play.

(2) The apparatus of clause (1), wherein the processor delays transmission of data indicating the rank and suit of the dealt card by not deriving the rank and suit of the dealt card until the server receives the status signal.

(3) The apparatus of clause (1) or (2), wherein the server sends the live feed via the Internet, as a broadcast signal, or over a wireless network.

(4) The apparatus of clause (1), (2) or (3), wherein the reader captures an image of the dealt card, the image comprises an indication of the rank and suit of the dealt card, the reader sends the image to the server, and the processor responsively determines the rank and suit of the dealt card from the image.

(5) The apparatus of clause (4), wherein the processor determines the rank and suit of the dealt card only after the status signal is received.

(6) The apparatus of clause (1), (2) or (3), wherein the reader comprises a bar code reader, each card contains a bar code identifying the card's rank and suit, the bar code reader reads the bar code of the dealt card when the face of the dealt card is passed over the reader, the bar code reader sends bar code information to the processor, and the processor responsively determines the rank and suit of the dealt card.

(7) The apparatus of clause (6), wherein the processor determines the rank and suit of the dealt card from the bar code only after the status signal is received.

(8) The apparatus of clause (1), (2) or (3), wherein the reader comprises a Radio Frequency Identification (RFID) reader, an RFID tag identifying a card's rank and suit is embedded within each card, the RFID reader reads the RFID tag of the card when the card is passed over the reader, the RFID reader sends an indication of the tag to the server, and the processor responsively determines the rank and suit of the card from the indication of the tag.

(9) The apparatus of clause (8), wherein the processor determines the rank and suit from the indication of the tag only after the status signal is received.

(10) The apparatus of clause (1), (2), (3), (4), (5), (6), (7), (8) or (9), further comprising a second reader that determines the status of the dealt card and transmits the status signal to the server.

(11) The apparatus of clause (10), wherein the second reader transmits the status signal to the server when the status of the dealt card is revealed or in the process of being revealed.

(12) The apparatus of clause (10) or (11), wherein the second reader comprises an Radio Frequency Identification (RFID) reader, each card is embedded with an RFID tag, the RFID reader reads the RFID tag of the dealt card at approximately the same time the card is lifted off the table, and wherein the RFID reader responsively sends the status signal to the processor.

(13) The apparatus of clause (10) or (11), wherein the reader and second reader each comprise an RFID reader, and wherein the server receives an indication of the card's rank and suit from the first reader at approximately the same time the server receives the status signal from the second reader indicating that the card is revealed.

(14) The apparatus of clause (10) or (11), wherein the second reader comprises a manual switch, the manual switch is activated when the status of card is revealed or in the process of being revealed, and the switch sends the status signal to the server when the switch is activated.

(15) The apparatus of clause (14) wherein the manual switch comprises a pushbutton.

(16) The apparatus of clause (14) wherein the manual switch comprises a foot pedal.

(17) The apparatus of any preceding clause wherein the camera comprises a plurality of cameras positioned in a plurality of locations at the gaming table.

(18) The apparatus of clause (1), (2), (3), (4) or (5), wherein the processor performs real-time image processing of a particular dealt card as shown in the live feed to determine the status of the dealt card.

(19) The apparatus of clause (1), (2), (3), (4), (5), (6), (7), (8), (9), (10), (11), (17) or (18), wherein the processor determines the status of the dealt card by determining that a predetermined portion of a face of a particular dealt card is visible.

(20) The apparatus of clause (19) wherein a predetermined portion of the face of a particular dealt card comprises 75% of the face of the card.

(21) A live dealer game display comprising: a live feed window comprising a view of a dealt card as the card is revealed, or in the process of being revealed; and a graphic display of a rank and suit of the dealt card that is revealed, or in the process of being revealed, wherein the graphic display of the rank and suit of the dealt card is synchronized with the appearance of the dealt card shown in the live feed.

(22) The display of clause (21), further comprising a graphic display of simulated game-play at the table, wherein the graphic display of simulated game-play at the table includes a display of a rank and suit of a dealt card that is revealed or in the process of being revealed, and the display of the rank and suit of the dealt card is synchronized with the appearance of the dealt card shown in the live feed.

(23) The display of clause (22), wherein (i) the graphic display of the rank and suit of the dealt card that is revealed, or in the process of being revealed, (ii) the appearance of the dealt card shown in the live feed, and (iii) the display of the rank and suit of the dealt card within the graphic display of the simulated game are all synchronized.

(24) A computer readable medium having stored therein instructions for causing a processor to execute the steps described in any of the preceding clauses.

(25) A method of synchronizing a live dealer game, wherein the live dealer game has a dealer at a gaming table in a live play area that deals cards, wherein the cards have a rank and suit, and at least one remote player participating through an electronic gaming device in communication with a server, comprising: sending a live feed of game-play at the gaming table to the remote player via the Internet, as a broadcast signal, or over a wireless network; receiving at the server an indication of the rank and suit of a particular dealt card; delaying transmission of data indicating the rank and suit of the particular dealt card to the electronic gaming device until the server receives a status signal indicating the status of the dealt card; and, upon receipt of the status signal by the server, transmitting the data indicating the rank and suit of the particular dealt card to the remote player, wherein the transmission is substantially synchronized with revealing the particular dealt card at the gaming table.

(26) The method of clause (25), wherein the status signal is received when the status of the particular dealt card is revealed.

(27) The method of clause (25), wherein the status signal is received when the status of the particular dealt card is in the process of being revealed.

(28) The method of clause (25), (26) or (27), wherein delaying transmission of data indicating the rank and suit of the particular dealt card comprises preventing the server from deriving the rank and suit of the particular dealt card until the server receives the status signal.

(29) The method of clause (25), (26), (27) or (28), further comprising performing real-time image processing of a particular dealt card as shown in the live feed to determine the status of the card.

(30) The method of clause (29), wherein performing real-time image processing of a particular dealt card shown in the live-feed comprises determining that a predetermined portion of the face of a particular dealt card is visible.

(31) The method of clause (30), wherein a predetermined portion of the face of a particular dealt card comprises 75% of the face of the card.

(32) The method of clause (25), (26), (27), (28), (29), (30) or (31), wherein receiving an indication of a particular dealt card's rank and suit comprises receiving an image of the card at the server.

(33) The method of clause (32), wherein an indication of the rank and suit of a particular dealt card at the server is derived by scanning the card through a reader.

(34) The method of clause (25), (26), (27), (28), (29), (30), (31), (32) or (33), further comprising analyzing the image of the card to determine the rank and suit of the card.

(35) The method of clause (25), (26), (27) or (28), wherein the indication of the rank and suit of the particular card dealt is generated by an RFID reader reading the RFID tag on a particular dealt card.

(36) The method of clause (35), wherein the RFID reader sends the status signal to the server at approximately the same time that the dealt card is revealed.

(37) The method of clause (35), wherein the RFID reader sends the status signal to the server at approximately the same time that the dealt card is in the process of being revealed.

(38) The method of clause (35), (36) or (37), wherein the RFID tag embedded in a card emits a radio signal in a particular orientation with respect the card, and receiving the status signal comprises the RFID reader reading the RFID tag of a particular card only when the radio signal has an orientation corresponding to the particular card being face-up, or to the particular card being in the process of being turned face-up.

(39) The method of clause (35), (36) or (37), wherein the RFID tag embedded in a card emits a radio signal that has a lower magnitude on one side of the card than the other, and receiving the status signal comprises the RFID reader detecting the magnitude of the signal and reading the RFID tag only when the signal has a magnitude that corresponds to the card being face-up, or to the card being in the process of being turned face-up.

Various embodiments have been described. Those skilled in the art will understand, however, that changes and modifications may be made to the embodiments described without departing from the true scope and spirit of the present invention, which is defined by the following claims.

What is claimed is:

1. A method of synchronizing a live dealer game, wherein the live dealer game has a dealer at a gaming table in a live play area that deals cards, wherein the cards have a rank and suit, and wherein at least one remote player participates in the live dealer game through an electronic gaming device in communication with a server, comprising:

receiving at the server an indication of the rank and suit of a dealt card, wherein the dealt card was dealt by the dealer during the live dealer game;

receiving at the server a status signal indicating a status of the dealt card, wherein transmission of the status signal to the server was substantially synchronized with the dealt card being revealed at the gaming table in the live play area; and in response to receiving the status signal at the server, transmitting data indicating the rank and suit of the dealt card to the electronic gaming device of the remote player, wherein the data indicating the rank and suit is derived from the received indication of the rank and suit of the dealt card.

2. The method of claim 1, further comprising refraining from deriving the rank and suit of the dealt card until the status signal is received.

3. The method of claim 1, wherein the status signal is generated by activation of a manual switch at the gaming table.

4. The method of claim 1:

wherein the status signal is generated in response to a determination that a portion of a face of the dealt card is visible at the gaming table.

5. The method of claim 4, sending a live feed of game-play at the gaming table to the electronic gaming device of the remote player; wherein the determination that a portion of the face of the dealt card is visible comprises real-time image processing of a live feed to determine if the dealt card has been revealed.

6. A method of synchronizing a live dealer game, wherein the live dealer game has a dealer at a gaming table in a live play area that deals cards, wherein the cards have a rank and suit, and wherein at least one remote player is participating in the live dealer game through an electronic gaming device in communication with a server, comprising:

transmitting an indication of the rank and suit of a dealt card to the server, wherein the dealt card was dealt by the dealer during the live dealer game; and detecting a revealing of the dealt card at the gaming table and responsively transmitting a status signal to the server, wherein transmission of the status signal to the server is substantially synchronized with the revealing of the dealt card at the gaming table, and wherein the status signal provides a status of the dealt card for use by the server in determining when to transmit data indicating the rank and suit of the dealt card to the electronic gaming device of the remote player.

7. The method of claim 6, further comprising sending a live feed of game-play at the gaming table to the electronic gaming device of the remote player.

8. The method of claim 6, wherein the status of the dealt card comprises an indication that the revealing of the dealt card has been detected.

9. The method of claim 6, wherein detecting the revealing of the dealt card comprises determining that at least a portion of a face of the dealt card is visible at the gaming table.

10. The method of claim 9, wherein determining that at least a portion of the face of the dealt card is visible at the gaming table comprises applying image processing to a live feed of game-play in the live dealer game at the gaming table to determine if at least a portion of a face of the dealt card is visible at the gaming table.

11. The method of claim 6, wherein each card has a Radio Frequency Identification (RFID) tag, and wherein detecting the revealing of the dealt card comprises an RFID reader reading the RFID tag of the dealt card upon the revealing of the dealt card at the gaming table.

12. The method of claim 6, wherein each card has a Radio Frequency Identification (RFID) tag, wherein an RFID reader is oriented at the gaming table so as to read an RFID tag of a given card only when the given card is revealed, and the method further comprising:

before transmitting the indication of the rank and suit of the dealt card to the server, the RFID reader at the gaming table reading the RFID tag on the dealt card to determine the indication of the rank and suit of the dealt card;

wherein detecting the revealing of the dealt card comprises the RFID reader reading the RFID tag of the dealt card upon the revealing of the dealt card at the gaming table.

13. A system for synchronizing a live dealer game, wherein the live dealer game has a dealer at a gaming table in a live play area that deals cards, wherein the cards have a rank and suit, and wherein at least one remote player is participating in the live dealer game through an electronic gaming device in communication with a server, the system comprising:

data storage;

a communication interface configured to:

receive an indication of the rank and suit of a dealt card, wherein the dealt card was dealt by the dealer during the live dealer game;

receive a status signal indicating a status of the dealt card, wherein transmission of the status signal was substantially synchronized with the dealt card being revealed at the gaming table in the live play area; and program code stored in the data storage and executable by a processor to:

store the indication of the rank and suit of a dealt card upon receipt; and in response to receipt of the status signal, transmit data indicating the rank and suit of the dealt card to the electronic gaming device of the remote player.

14. The system of claim 13, wherein the system is further configured to send a live feed of game-play at the gaming table to the electronic gaming device of the remote player.

15. The system of claim 13, further comprising program code stored in the data storage and executable by the processor to:

in response to receipt of the status signal, retrieve the stored indication of the rank and suit of a dealt card; and derive the data indicating the rank and suit of the dealt card from the stored indication of the rank and suit of a dealt card.

* * * * *